United States Patent
Enjoji et al.

(10) Patent No.: US 7,022,430 B2
(45) Date of Patent: Apr. 4, 2006

(54) COMPACT FUEL CELL WITH IMPROVED FLUID SUPPLY

(75) Inventors: Naoyuki Enjoji, Utsunomiya (JP); Masaharu Suzuki, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 406 days.

(21) Appl. No.: 10/338,496

(22) Filed: Jan. 7, 2003

(65) Prior Publication Data
US 2003/0129475 A1 Jul. 10, 2003

(30) Foreign Application Priority Data
Jan. 7, 2002 (JP) .............................. 2002-000496

(51) Int. Cl.
*H01M 8/02* (2006.01)
(52) U.S. Cl. .............................. 429/39; 429/38; 429/26
(58) Field of Classification Search .................... None
See application file for complete search history.

(56) References Cited
U.S. PATENT DOCUMENTS
6,749,959 B1 * 6/2004 Nakata et al. ................ 429/34

FOREIGN PATENT DOCUMENTS

| DE | 2214412 | | 10/1973 |
|---|---|---|---|
| DE | 211130 | | 7/1984 |
| DE | 4113049 | A1 | 12/1991 |
| DE | 43333478 | A1 | 8/1994 |
| DE | 19712864 | C2 | 10/1998 |
| JP | 8-222237 | A | 8/1996 |
| JP | 2000-182631 | A | 6/2000 |
| JP | 2000182631 | A * | 6/2000 |

OTHER PUBLICATIONS

German Office Action, Serial No. 103 00 068.2-45, dated Oct. 10, 2005.

* cited by examiner

Primary Examiner—Michael Barr
Assistant Examiner—Karie O'Neill
(74) Attorney, Agent, or Firm—Lahive & Cockfield, LLP; Anthony A. Laurentano, Esq.

(57) ABSTRACT

A fuel cell has a membrane electrode assembly and first and second metal sheet separators. The first metal sheet separator has a fuel gas passage defined on a surface thereof. The fuel gas passage has a plurality of embossed bodies projecting from the surface which faces the membrane electrode assembly, and pairs of guide ribs provided by joining two or more of the embossed bodies.

4 Claims, 16 Drawing Sheets

COMPACT FUEL CELL WITH IMPROVED FLUID SUPPLY

BACKGROUND OF THE INVENTION

1. Field of the Invention

The present invention relates to a fuel cell comprising a membrane electrode assembly having an electrolyte and electrodes disposed on respective opposite sides of the electrolyte, and a pair of metal sheet separators sandwiching the membrane electrode assembly, the separators having reactant gas passages for supplying reactant gases to the surfaces of the electrodes of the membrane electrode assembly.

2. Description of the Related Art

Solid polymer electrolyte fuel cells employ an ion exchange membrane (electrolyte) comprising a solid polymer ion exchange membrane (proton exchange membrane). A membrane electrode assembly comprises an anode and a cathode, each made up of an electrode catalyst and a porous carbon sheet, that are disposed in confronting relation to the opposite sides of the ion exchange membrane. The membrane electrode assembly is sandwiched between separators (bipolar plates), making up a unit cell. A predetermined number of such unit cells are stacked for use as a fuel cell stack.

When a fuel gas, e.g., a gas mainly containing hydrogen (hereinafter referred to as "hydrogen-containing gas") is supplied to the anode, the hydrogen in the gas is ionized on the electrode catalyst and moves through the ion exchange membrane to the cathode. Electrons produced while the hydrogen is in motion are supplied to an external circuit, which uses the electrons as an electric energy in the form of a direct current. Since the cathode is supplied with a gas mainly containing oxygen or air (hereinafter referred to as "oxygen-containing gas"), for example, hydrogen ions, electrons, and oxygen react with each other on the cathode, producing water.

In the fuel cell stack, the separators have, defined within their surfaces, a fuel gas passage for passing a fuel gas therethrough in facing relation to the anode and an oxidizing gas passage for passing an oxygen-containing gas therethrough in facing relation to the cathode. Coolant passages for passing a coolant therethrough are defined between the separators, the coolant passages extending along the surfaces of the separators.

Generally, the fuel gas passage and the oxygen-containing gas passage (hereinafter referred to as "reactant gas passages") and the coolant passages are in the form of a plurality of passage grooves defined in the surfaces of the separators and extending from passage inlets to passage outlets which extend in the direction in which the separators are stacked. The passage grooves include straight grooves and folded grooves.

If the passage grooves are connected to passage inlets and outlets which comprise small openings, then buffer areas need to be provided around the passage inlets and outlets in order to supply fluids, including the fuel gas, the oxygen-containing gas, and the coolant uniformly into the surfaces of the separators along the passage grooves. If the passage grooves extend parallel to each other, then generated water tends to stay in particular passage grooves, and cannot be discharged efficiently therefrom.

There is known a fuel cell separator as disclosed in Japanese laid-open patent publication No. 8-222237, for example. According to the disclosed arrangement, as shown in FIG. 16 of the accompanying drawings, a separator sheet 1 comprises a thin metal sheet and has a number of embossed or dimpled protrusions 2, 3 formed on its face and back surfaces at spaced intervals of several mm.

The separator sheet 1 has a fuel gas inlet 4a and a fuel gas outlet 4b that are defined in respective opposite side edges thereof, and an oxygen-containing gas inlet 5a and an oxygen-containing gas outlet 5b that are defined in respective opposite upper and lower edges thereof.

The protrusions 2 project from one surface 1a of the separator sheet 1, defining a fuel gas passage 6 therebetween which communicate with the fuel gas inlet 4a and the fuel gas outlet 4b. The protrusions 3 project from the other surface 1b of the separator sheet 1, defining an oxygen-containing gas passage 7 therebetween which communicate with the oxygen-containing gas inlet 5a and the oxygen-containing gas outlet 5b.

A fuel gas supplied from the fuel gas inlet 4a to the surface 1a of the separator sheet 1 flows through the fuel gas passage 6 continuously extending between the protrusions 2, and is supplied to an electrode (not shown). The fuel gas which is not used is discharged into the fuel gas outlet 4b.

An oxygen-containing gas supplied from the oxygen-containing gas inlet 5a to the surface 1b of the separator sheet 1 flows through the oxygen-containing gas passage 7 continuously extending between the protrusions 3, and is supplied to an electrode (not shown). The oxygen-containing gas which is not used is discharged into the oxygen-containing gas outlet 5b.

On the separator sheet 1, the protrusions 2, 3 project on respective different sides thereof, and the fuel gas passage 6 and the oxygen-containing gas passage 7 are defined by the protrusions 2, 3 which are independent of each other. Therefore, the fuel gas and the oxygen-containing gas tend to fail to flow uniformly in the surfaces 1a, 1b, producing areas in the surfaces 1a, 1b where the fuel gas and the oxygen-containing gas are not sufficiently supplied to the fuel gas passage 6 and the oxygen-containing gas passage 7. Therefore, it is difficult to supply the fuel gas and the oxygen-containing gas uniformly to the surfaces of the electrodes, and generated water is liable to be trapped by and stay around the protrusions 3, etc. and cannot smoothly be discharged.

Coolant passages may be defined between the protrusions of the separator sheet 1. If there are areas where the coolant does not smoothly flow through the coolant passages, then the electrodes are not cooled sufficiently, resulting in a higher temperature and a lower humidity which lead to an increased resistance overpotential.

When the electrodes are not cooled sufficiently, the distribution of electric energy generated in the generating surface of the fuel cell is likely to become irregular and the durability of the fuel cell tends to be lowered due to an increase in the temperature of the ion exchange membrane. If an increased amount of coolant is supplied to prevent the above performance reduction, then the overall fuel cell system suffers a drop in the efficiency and an increase in the pressure loss.

There is also known another fuel cell separator as disclosed in Japanese laid-open patent publication No. 2000-182631, for example. The disclosed separator is made of gas-impermeable dense carbon and has a plurality of convexities on both surfaces thereof which define reactant gas passages. The reactant gas passages have bent portions having channel-shaped bent ribs which define a plurality of equally spaced grooves for allowing reactant gases to flow smoothly along the bent portions.

However, since the separator is made of dense carbon, it has low toughness, is less resistant to vibrational fracture, and has a considerably large thickness. Therefore, fuel cells incorporating the disclosed separator cannot be reduced in overall size and weight.

SUMMARY OF THE INVENTION

It is a major object of the present invention to provide a fuel cell which is capable of supplying fluids such as reactant gases smoothly and uniformly along the surfaces of separators and of achieving a good power generating capability with a small and simple arrangement.

According to the present invention, a fuel cell has a pair of separators in the form of thin metal sheets. At least one of the separators has a reactant gas passage having a plurality of protrusions projecting from an electrode and guide ribs provided by joining two or more of the protrusions. The protrusions may be embossed or dimpled bodies.

The reactant gas passage is capable of smoothly supplying a reactant gas as it is being guided by the protrusions and the guide ribs, and hence of guiding the reactant gas to the surface of the electrode. The reactant gas can therefore be supplied sufficiently to the electrode surface, and the ability of the fuel cell to discharge generated water is prevented from being lowered by a flow failure of the reactant gas which would otherwise be caused.

One of the separators has a coolant passage for supplying a coolant to cool an electrolyte electrode assembly. The coolant passage has a plurality of protrusions and guide ribs provided by joining two or more of the protrusions. The coolant passage is capable of uniformly guiding the coolant along the electrode surface for sufficiently cooling the fuel cell for an increased power generating capability.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
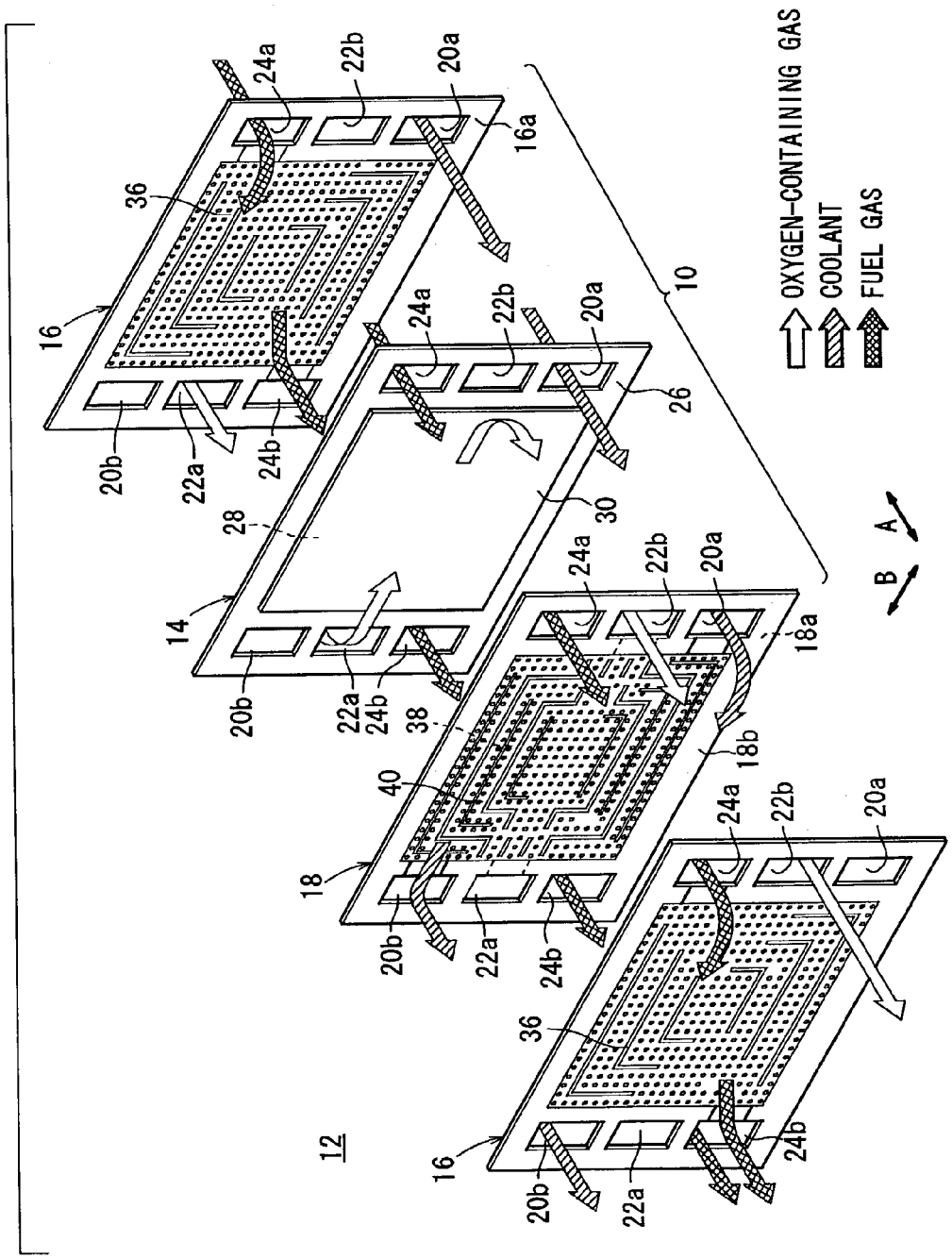
FIG. 1 is an exploded perspective view of a portion of a fuel cell stack incorporating a fuel cell according to a first embodiment of the present invention.
Figure 2:
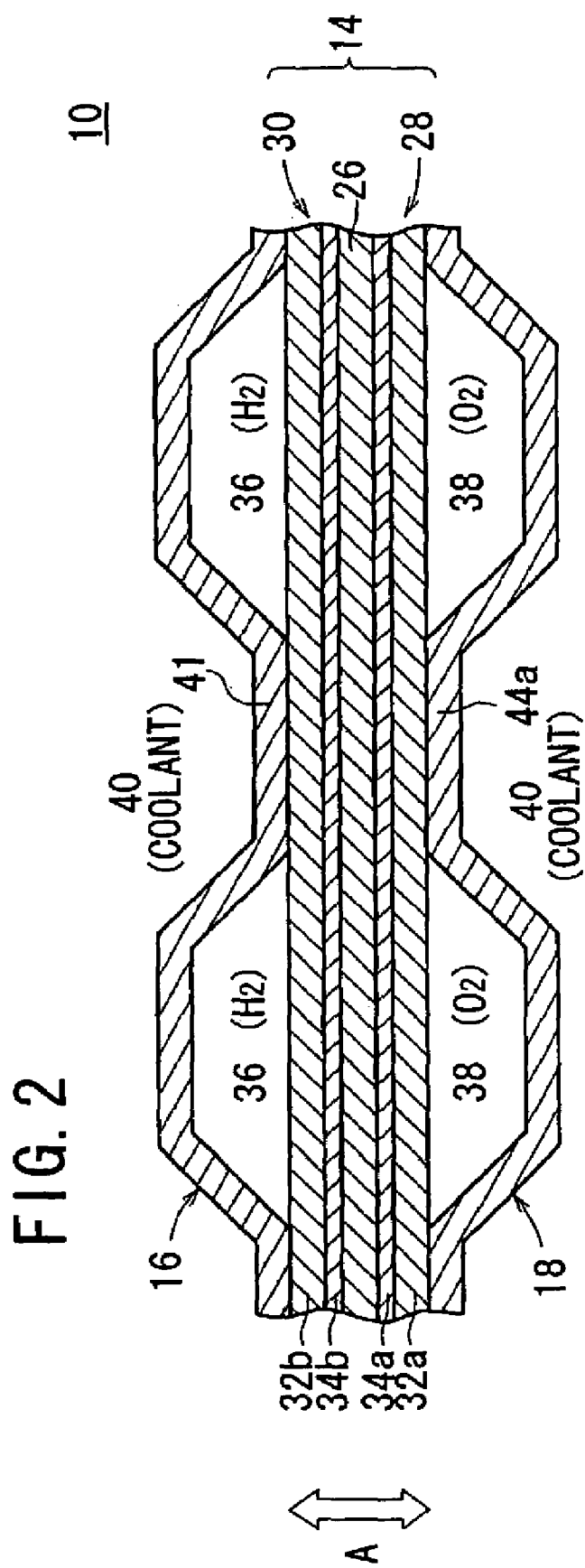
FIG. 2 is a fragmentary cross-sectional view of the fuel cell.

FIG. 1 shows in exploded perspective a portion of a fuel cell stack 12 incorporating a fuel cell (unit cell) 10 according to a first embodiment of the present invention, and FIG. 2 shows the fuel cell 10 in fragmentary cross section.

As shown in FIG. 1, the fuel cell stack 12 comprises a plurality of fuel cells 10 stacked in the direction indicated by the arrow A. Each of the fuel cells 10 comprises a membrane electrode assembly (electrolyte electrode assembly) 14 and first and second separators 16, 18 sandwiching the membrane electrode assembly 14 therebetween. Each of the first and second separators 16, 18 comprises a thin metal sheet.

The membrane electrode assembly 14 and the first and second separators 16, 18 have, defined in a longitudinal end thereof (in the direction indicated by the arrow B), respective coolant outlets 20b communicating with each other in the direction indicated by the arrow A, for discharging a coolant, respective oxygen-containing gas inlets 22a communicating with each other in the direction indicated by the arrow A, for supplying an oxygen-containing gas, e.g., an oxygen-containing gas, and respective fuel gas outlets 24b communicating with each other in the direction indicated by the arrow A, for discharging a fuel gas, e.g., a hydrogen-containing gas.

The membrane electrode assembly 14 and the first and second separators 16, 18 also have, defined in an opposite longitudinal end thereof, respective fuel gas inlets 24a communicating with each other in the direction indicated by the arrow A, for supplying the fuel gas, respective oxygen-containing gas outlets 22b communicating with each other in the direction indicated by the arrow A, for discharging the oxygen-containing gas, and respective coolant inlets 20a communicating with each other in the direction indicated by the arrow A, for supplying the coolant.

The membrane electrode assembly 14 comprises a solid polymer ion exchange membrane (electrolyte) 26 in the form of a thin film of perfluorosulfonic acid impregnated with water, and an anode 28 and a cathode 30 which sandwich the solid polymer ion exchange membrane 26 therebetween.

As shown in FIG. 2, the anode 28 and the cathode 30 have respective gas diffusion layers 32a, 32b made of carbon paper or the like and respective electrode catalyst layers 34a, 34b comprising porous carbon particles carrying a platinum alloy on their surfaces and uniformly applied to the surfaces of the gas diffusion layers 32a, 32b. The electrode catalyst layers 34a, 34b are joined to the respective opposite surfaces of the solid polymer ion exchange membrane 26.

As shown in FIG. 1, the first separator 16 has a fuel gas passage (reactant gas passage) 36 defined on a surface 16a thereof which faces the membrane electrode assembly 14. The fuel gas passage 36 communicates with the fuel gas inlet 24a and the fuel gas outlet 24b.

The second separator 18 has an oxygen-containing gas passage (reactant gas passage) 38 defined on a surface 18a thereof which faces the membrane electrode assembly 14 in communication with the oxygen-containing gas inlet 22a and the oxygen-containing gas outlet 22b. The second separator 18 also has a coolant passage 40 defined on an opposite surface 18b in communication with the coolant inlet 20a and the coolant outlet 20b.

Figure 3:
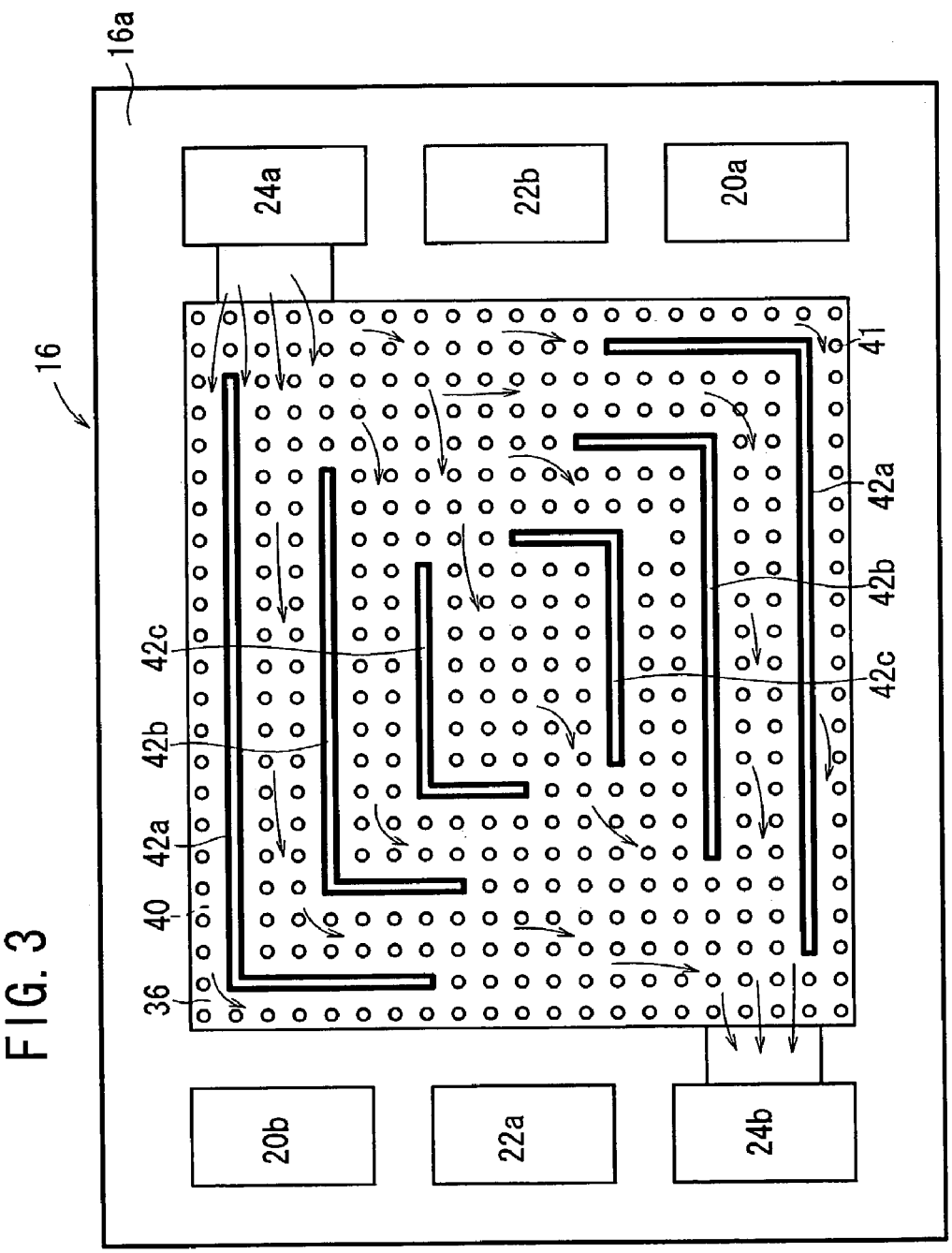
FIG. 3 is a front elevational view of a first separator of the fuel cell.

As shown in FIGS. 1 and 3, the first separator 16 has a plurality of protrusions, e.g., embossed bodies, 41 projecting from at least the surface 16a. Two or more embossed bodies 41 are joined together into pairs of guide ribs 42a, 42b, 42c for uniformly guiding the fuel gas into the membrane electrode assembly 14. The embossed bodies 41 and the guide ribs 42a, 42b, 42c jointly define the fuel gas passage 36.

The guide ribs 42a are bent into a substantially L-shaped structure and disposed in upper and lower areas within the surface 16a along outer peripheral edges of the electrode surface (generating surface) where the fuel gas is less likely to flow smoothly. The guide rigs 42b are positioned inwardly of the guide ribs 42a and bent into a substantially L-shaped structure. The guide rigs 42c are positioned inwardly of the guide ribs 42b and bent into a substantially L-shaped structure. The guide ribs 42a, 42b, 42c have horizontal portions successively shorter in the order named.

Figure 4:
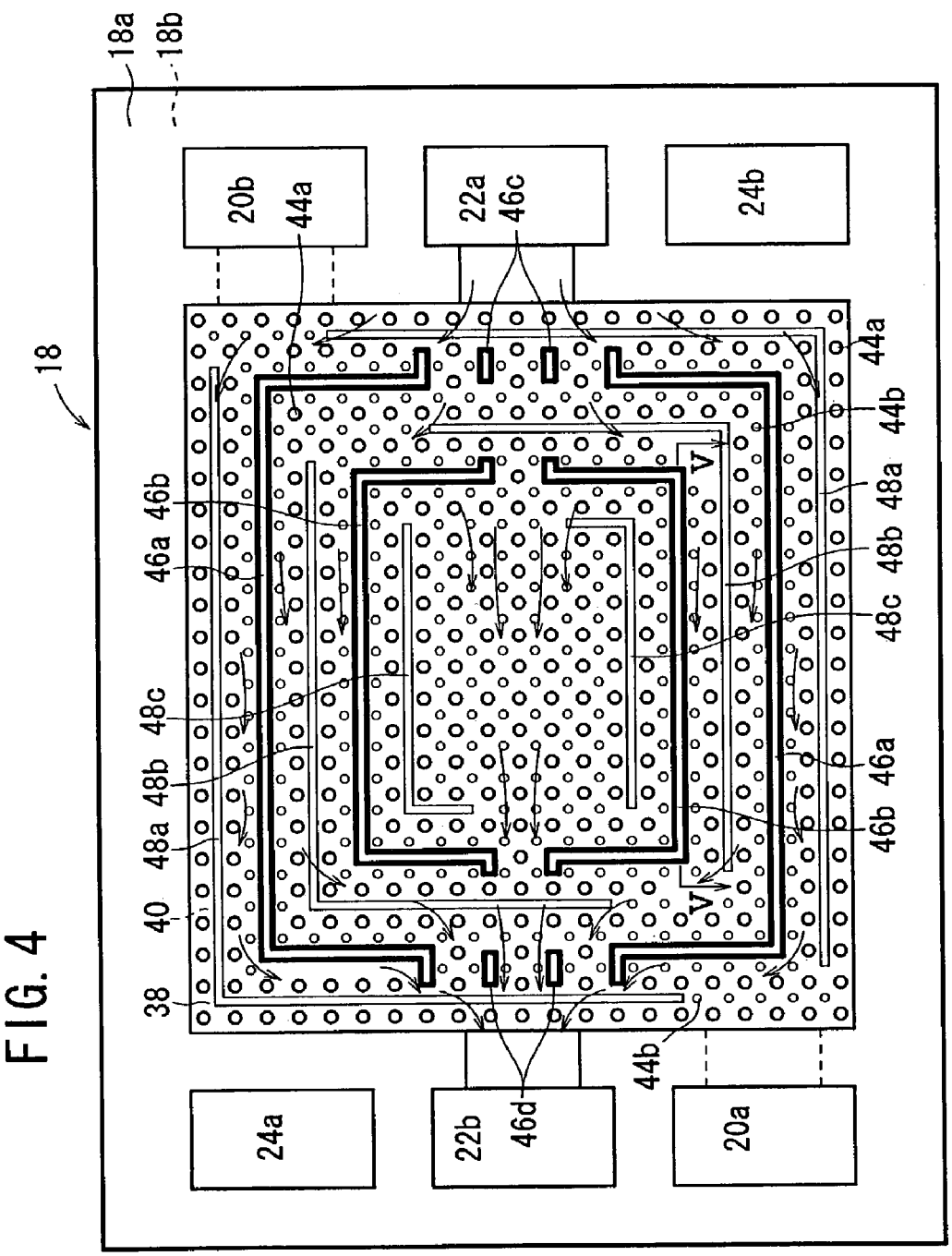
FIG. 4 is a front elevational view of a surface of a second separator of the fuel cell.
Figure 5:
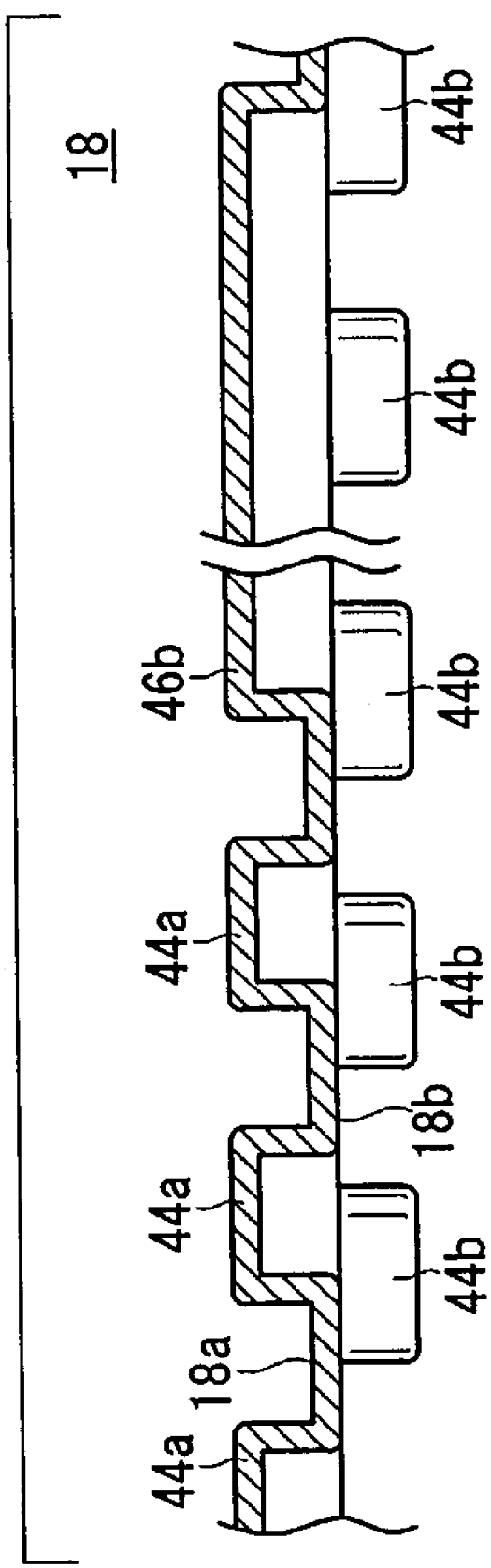
FIG. 5 is an enlarged cross-sectional view taken along line V—V of FIG. 4.

As shown in FIGS. 4 and 5, the second separator 18 has a plurality of embossed bodies 44a, 44b projecting alternately from the surfaces 18a, 18b thereof. As shown in FIG. 4, two or more embossed bodies 44a on the surface 18a of the second separator 18 are joined together into pairs of guide ribs 46a, 46b, 46c, 46d. The embossed bodies 44a and the guide ribs 46a, 46b, 46c, 46d jointly define the oxygen-containing gas passage 38.

The guide ribs 46a have portions extending horizontally toward the oxygen-containing gas inlet 22a and the oxygen-containing gas outlet 22b, portions extending vertically, and portions extending horizontally along outer peripheral edges of the generating surface.

The guide ribs 46b are positioned inwardly of the guide ribs 46a and similar in shape to the guide ribs 46a. The guide ribs 46c, 46d, which are straight in shape, are positioned on horizontal extensions of the opposite ends of the guide ribs 46b. Stated otherwise, the guide ribs 46c, 46d are separate from the guide ribs 46b.

Two or more embossed bodies 44a on the surface 18b of the second separator 18 are joined together into pairs of guide ribs 48a, 48b, 48c. The embossed bodies 44b and the guide ribs 48a, 48b, 48c jointly define the coolant passage 40. The guide ribs 48a, 48b, 48c are similar in structure to the guide ribs 42a, 42b, 42c (see FIG. 3) of the first separator 16, and will not be described in detail below.

Figure 6:
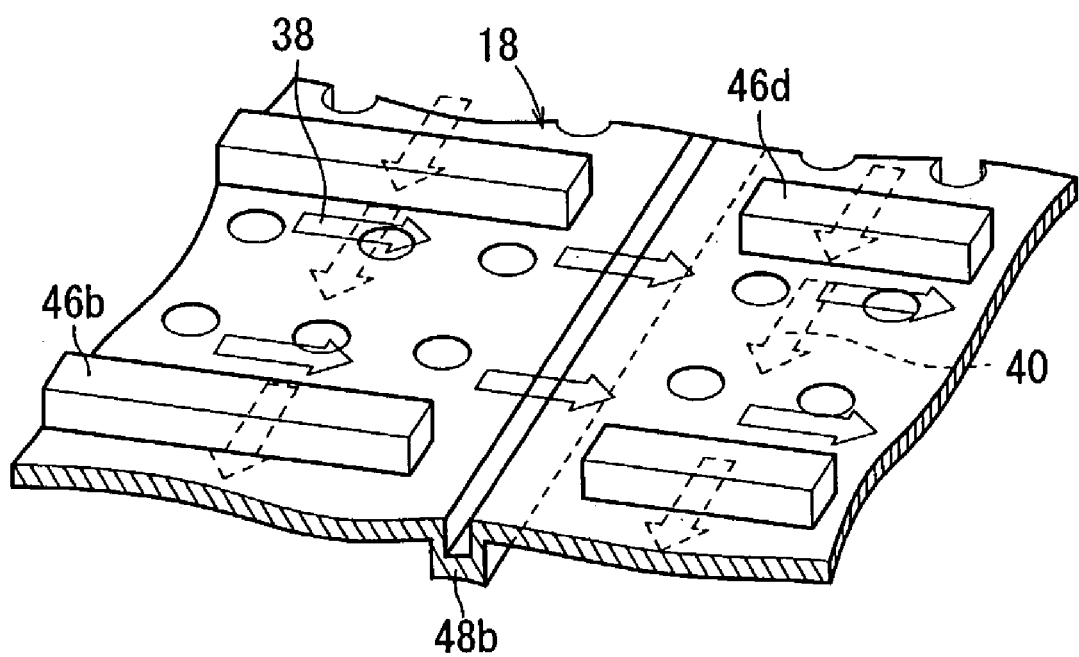
FIG. 6 is a fragmentary perspective view of the second separator.

On the second separator 18, in areas where the ribs on both surfaces thereof, i.e., the guide ribs 46a, 46b, 46c, 46d on the surface 18a and the guide ribs 48a, 48b, 48c on the surface 18b, overlap each other, those ribs which are given preferential control over a fluid flow are continuous, and those which are not are interrupted. Specifically, as shown in FIG. 6, the guide ribs 48b of the coolant passage 40 are continuous, and the guide ribs 46b of the oxygen-containing gas passage 38 are interrupted (not continuous), and the guide ribs 46d are provided in spaced relation to the guide ribs 46b.

Operation of the fuel cell 10 thus constructed will be described below.

As shown in FIG. 1, the fuel cell stack 12 is supplied with a fuel gas such as a hydrogen-containing gas or the like, an oxygen-containing gas such as air, and a coolant such as pure water, ethylene glycol, oil, or the like. The fuel gas, the oxygen-containing gas, and the coolant are supplied successively to the fuel cells 10 stacked in the direction indicated by the arrow A in the fuel cell stack 12.

The oxygen-containing gas supplied to the oxygen-containing gas inlets 22a which communicate with each other in the direction indicated by the arrow A is introduced into the oxygen-containing gas passage 38 on the second separator 18 and moves along the cathode 30 of the membrane electrode assembly 14, as shown in FIGS. 1 and 4. The fuel gas is introduced from the fuel gas inlets 24a into the fuel gas passage 36 on the first separator 16 and moves along the anode 28 of the membrane electrode assembly 14, as shown in FIGS. 1 and 3.

In the membrane electrode assembly 14, therefore, the oxygen-containing gas supplied to the cathode 30 and the fuel gas supplied to the anode 28 are consumed by an electrochemical reaction in the electrode catalyst layers 34b, 34a, generating electric energy (see FIG. 2).

The fuel gas supplied to and consumed by the anode 28 is discharged into the fuel gas outlets 24b (see FIG. 3). Similarly, the oxygen-containing gas supplied to and consumed by the cathode 30 is discharged into the oxygen-containing gas outlets 22b (see FIG. 4).

The coolant supplied to the coolant inlets 20a is introduced into the coolant passage 40 on the second separator 18. The coolant cools the membrane electrode assembly 14, and then is discharged into the coolant outlets 20b (see FIG. 1).

In the first embodiment, as shown in FIG. 3, the oxygen-containing gas passage 38 on the surface 16a of the first separator 16 has the embossed bodies 41 and the guide ribs 42a, 42b, 42c defined by two or more embossed bodies 41 joined together.

The guide ribs 42a, 42b, 42c are provided in those areas where the fuel gas is less likely to flow smoothly. The fuel gas is thus uniformly guided along the fuel gas passage 36 into the electrode surface. Therefore, the fuel gas is sufficiently supplied to the electrode surface, and the ability of the fuel cell to discharge generated water is prevented from being lowered by a flow failure of the fuel gas which would otherwise be caused.

Figure 7:
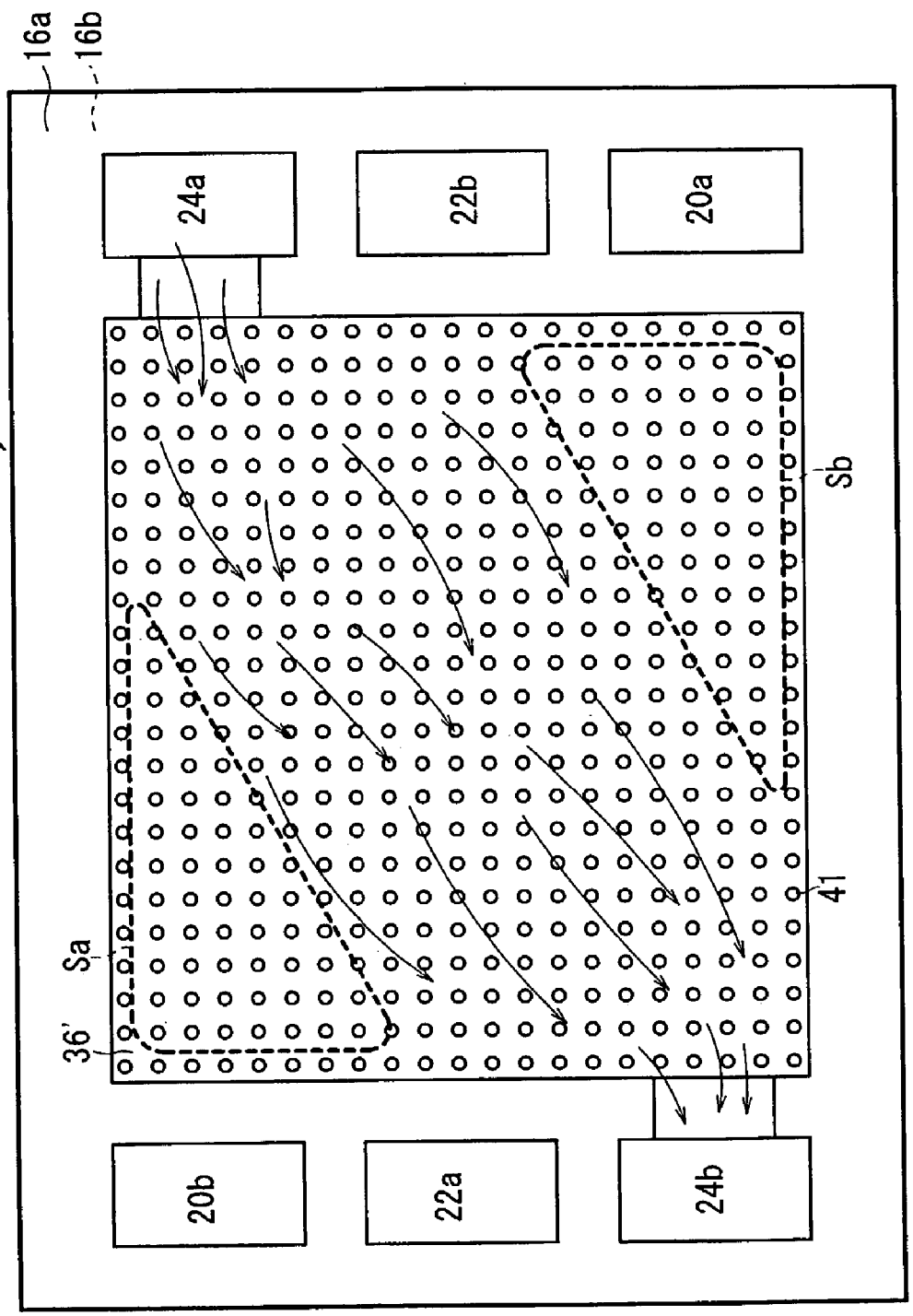
FIG. 7 is a front elevational view of a conventional separator shown for comparison with the first separator according to the first embodiment of the present invention.

Specifically, as shown in FIG. 7, if a first separator 16' has only embossed bodies 41, then when the fuel gas is supplied from the fuel gas inlet 24a into a fuel gas passage 36', areas Sa, Sb where the fuel gas is less likely to flow tend to be present in the fuel gas passage 36'. Therefore, the fuel gas is not sufficiently supplied to the areas Sa, Sb, and hence is not uniformly and smoothly supplied to the membrane electrode assembly 14. As a result, the power generating capability is lowered, and generated water tends to stay in the areas Sa, Sb.

According to the first embodiment of the present invention, the fuel gas is uniformly distributed and moves in the entire fuel gas passage 36, and hence is sufficiently supplied to the entire electrode surface. Therefore, the power generating capability of the fuel cell 10 is increased, and the pressure loss is effectively reduced.

The coolant is also uniformly supplied from the coolant inlet 20a to the coolant passage 40, and is smoothly discharged from the coolant passage 40 to the coolant outlets 20b. Therefore, the heat generated when the fuel cell 10 generates electric energy is sufficiently dissipated, the humidity is effectively prevented from being lowered in the fuel cell 10 due to a temperature rise, and the resistance overpotential of the fuel cell 10 is not increased. The distribution of electric energy generated in the generating surface of the fuel cell 10 is prevented from becoming irregular and the durability of the fuel cell 10 is prevented from being lowered due to an increase in the temperature of the solid ion exchange membrane 20. The fuel cell 10 thus has an efficient cooling capability.

As shown in FIG. 6, the guide ribs 48b of the coolant passage 40 are continuous, and the guide ribs 46b of the oxygen-containing gas passage 38 are interrupted, and the guide ribs 46d are provided in spaced relation to the guide ribs 46b. Consequently, the passage configurations on the face and back sides of the separator are not subject to limitations, unlike conventional passages provided by corrugated plates, and the oxygen-containing gas passage 38 and the coolant passage 40 can be provided in dependently of each other. As a result, the fuel cell 10 has a high level of design freedom.

In the first embodiment, the embossed bodies 41, 44a, 44b are provided as embossed protrusions on the first and second separators 16, 18. However, dimpled bodies may be provided on the separators. This modification is also applicable to other embodiments which will be described below.

Figure 8:
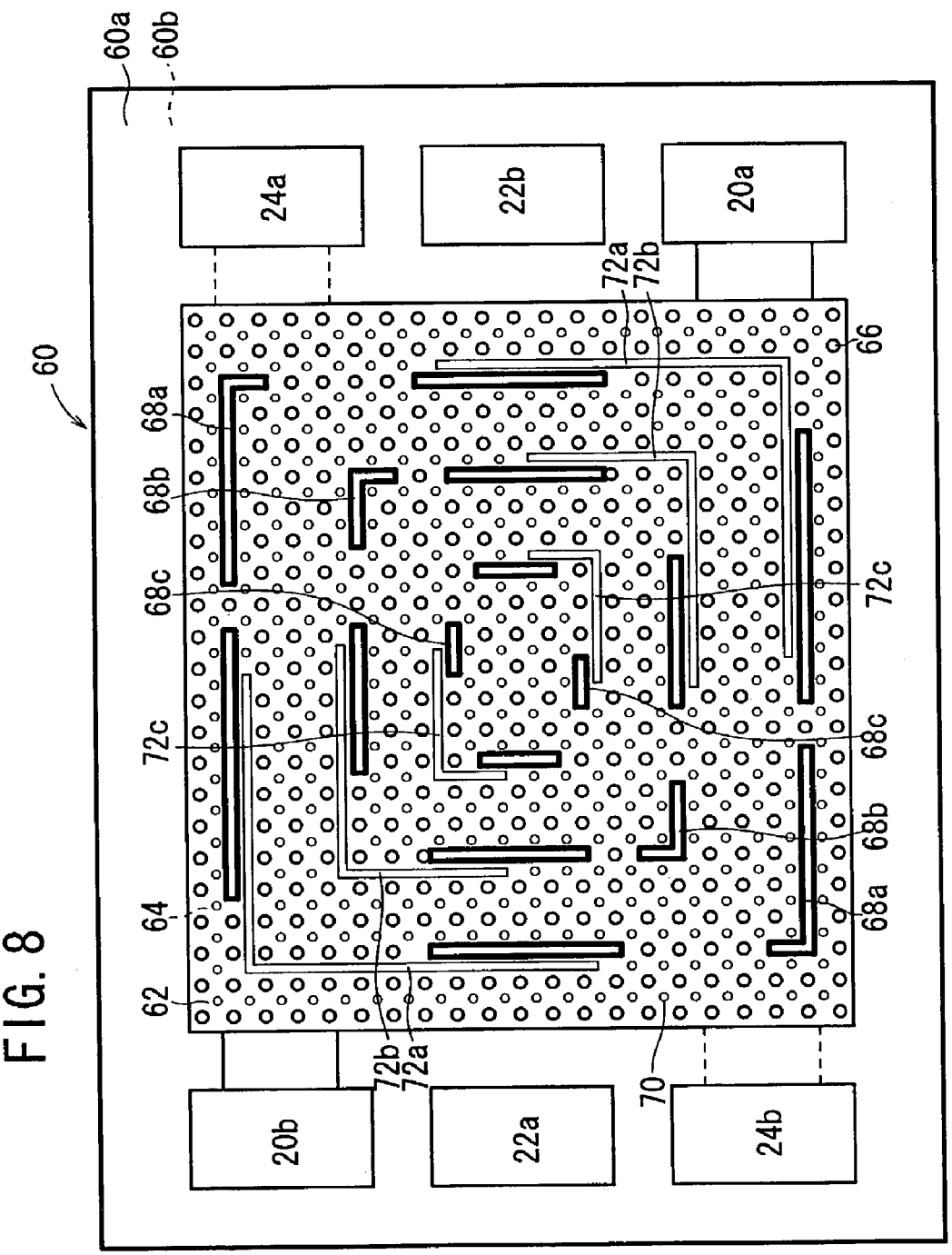
FIG. 8 is a front elevational view of a separator of a fuel cell according to a second embodiment of the present invention.

FIG. 8 shows in front elevation a separator 60 of a fuel cell according to a second embodiment of the present invention. Those parts of the fuel cell shown in FIG. 8 which are identical to those of the fuel cell 10 shown in FIG. 1 are denoted by identical reference characters, and will not be described in detail below. Those parts of fuel cells according to third through ninth embodiments, to be described later on, which are identical to those of the fuel cell 10 shown in FIG. 1 are also denoted by identical reference characters, and will not be described in detail below.

In FIG. 8, the separator 60 has a coolant passage 62 defined on a surface 60a thereof and a fuel gas passage 64 defined on an opposite surface 60b thereof. The coolant passage 62 has a plurality of embossed bodies 66 projecting from the surface 60a and pairs of guide ribs 68a, 68b, 68c which are provided by joining two or more embossed bodies 66. The guide ribs 68a, 68b, 68c are substantially L-shaped as a whole, each divided into three or two segments, and provided in areas where the coolant is less likely to flow.

The fuel gas passage 64 has a plurality of embossed bodies 70 projecting from the surface 60b and pairs of guide ribs 72a, 72b, 72c which are provided by joining two or more embossed bodies 70. The guide ribs 72a, 72b, 72c are substantially L-shaped, and are provided in positions for guiding a fuel gas supplied from the fuel gas inlet 24a uniformly to the entire electrode surface and discharging the fuel gas to the fuel gas outlet 24b.

Figure 9:
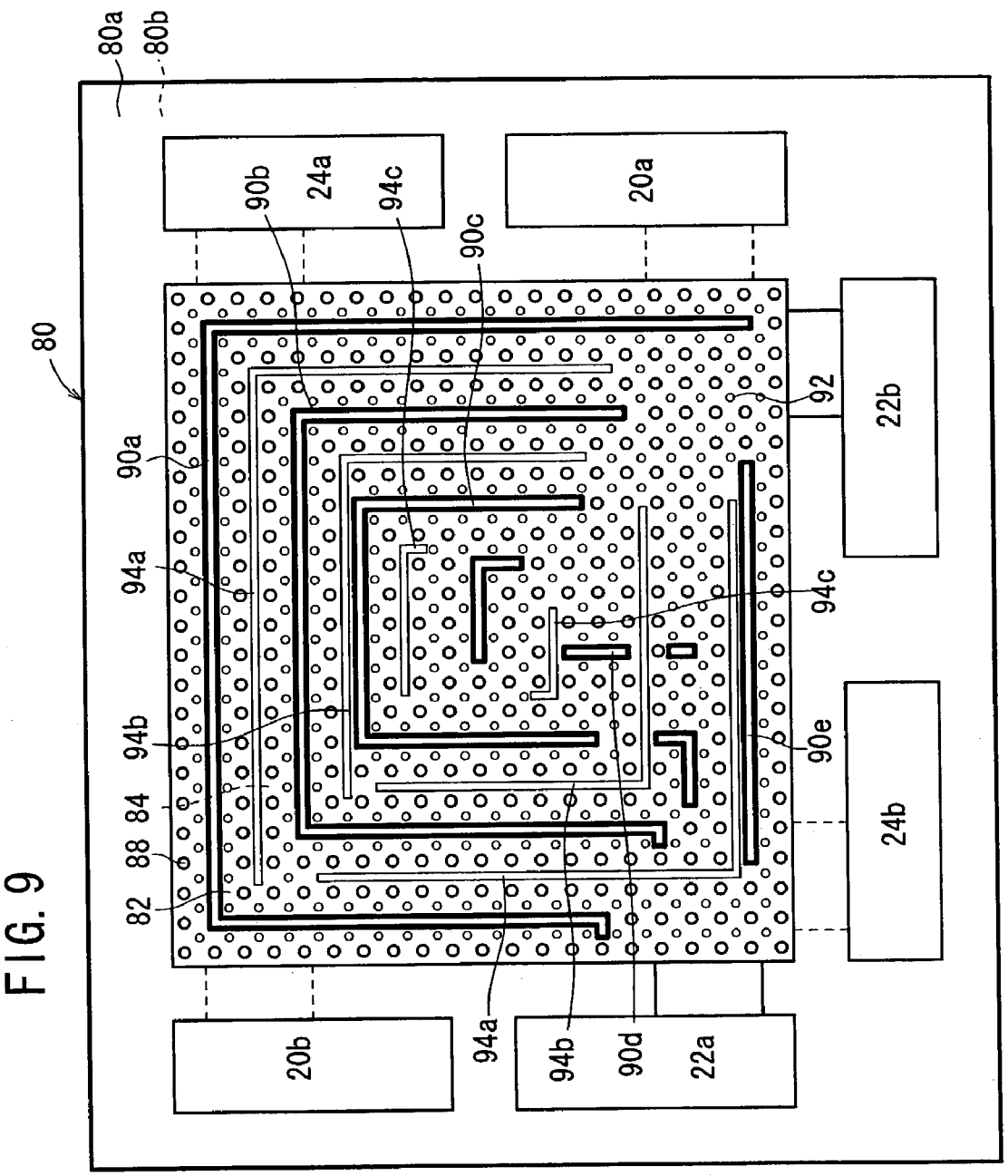
FIG. 9 is a front elevational view of a separator of a fuel cell according to a third embodiment of the present invention.

FIG. 9 shows in front elevation a separator 80 of a fuel cell according to a third embodiment of the present invention.

In FIG. 9, the separator 80 has a coolant outlet 20b and an oxygen-containing gas inlet 22a which are defined in a longitudinal end thereof, and a fuel gas inlet 24a and a coolant inlet 20a which are defined in an opposite longitudinal end thereof. The separator 80 also has an oxygen-containing gas outlet 22b and a fuel gas outlet 24b which are defined in a lower edge thereof. The separator 80 also has an oxygen-containing gas passage 82 defined on a surface 80a thereof and a coolant passage 84 defined on an opposite surface 80b thereof.

The oxygen-containing gas passage 82 has a plurality of embossed bodies 88 projecting from the surface 80a and guide ribs 90a, 90b, 90c, 90d, 90e which are provided by joining two or more embossed bodies 88. The guide ribs 90a through 90e are of respective predetermined shapes, and serve to supply an oxygen-containing gas from the oxygen-containing gas inlet 22a smoothly to the oxygen-containing gas outlet 22b.

The coolant passage 84 has a plurality of embossed bodies 92 projecting from the surface 80b and guide ribs 94a, 94b, 94c which are provided by joining two or more embossed bodies 92. The guide ribs 94a, 94b, 94c are substantially L-shaped.

Figure 10:
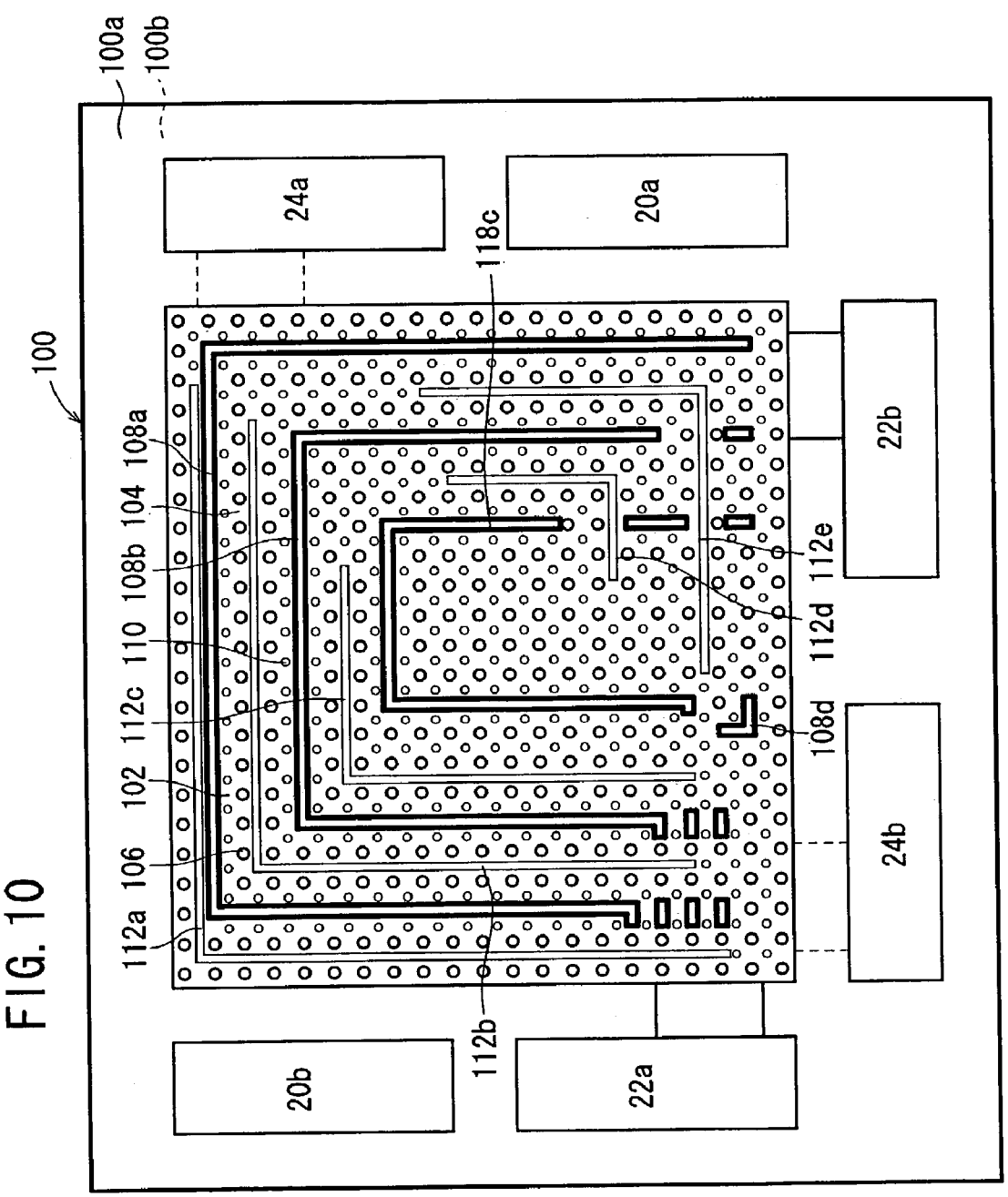
FIG. 10 is a front elevational view of a separator of a fuel cell according to a fourth embodiment of the present invention.

FIG. 10 shows in front elevation a separator 100 of a fuel cell according to a fourth embodiment of the present invention.

In FIG. 10, the separator 100 has an oxygen-containing gas passage 102 defined on a surface 100a thereof and a fuel gas passage 104 defined on an opposite surface 100b thereof. The oxygen-containing gas passage 102 has a plurality of embossed bodies 106 projecting from the surface 100a and guide ribs 108a, 108b, 108c, 108d which are provided by joining two or more embossed bodies 106. The guide ribs 108a through 108d are interrupted.

The fuel gas passage 104 has a plurality of embossed bodies 110 projecting from the surface 100b and guide ribs 112a, 112b, 112c, 112d, 112e which are provided by joining two or more embossed bodies 110. The guide ribs 112a through 112e are substantially L-shaped.

Figure 11:
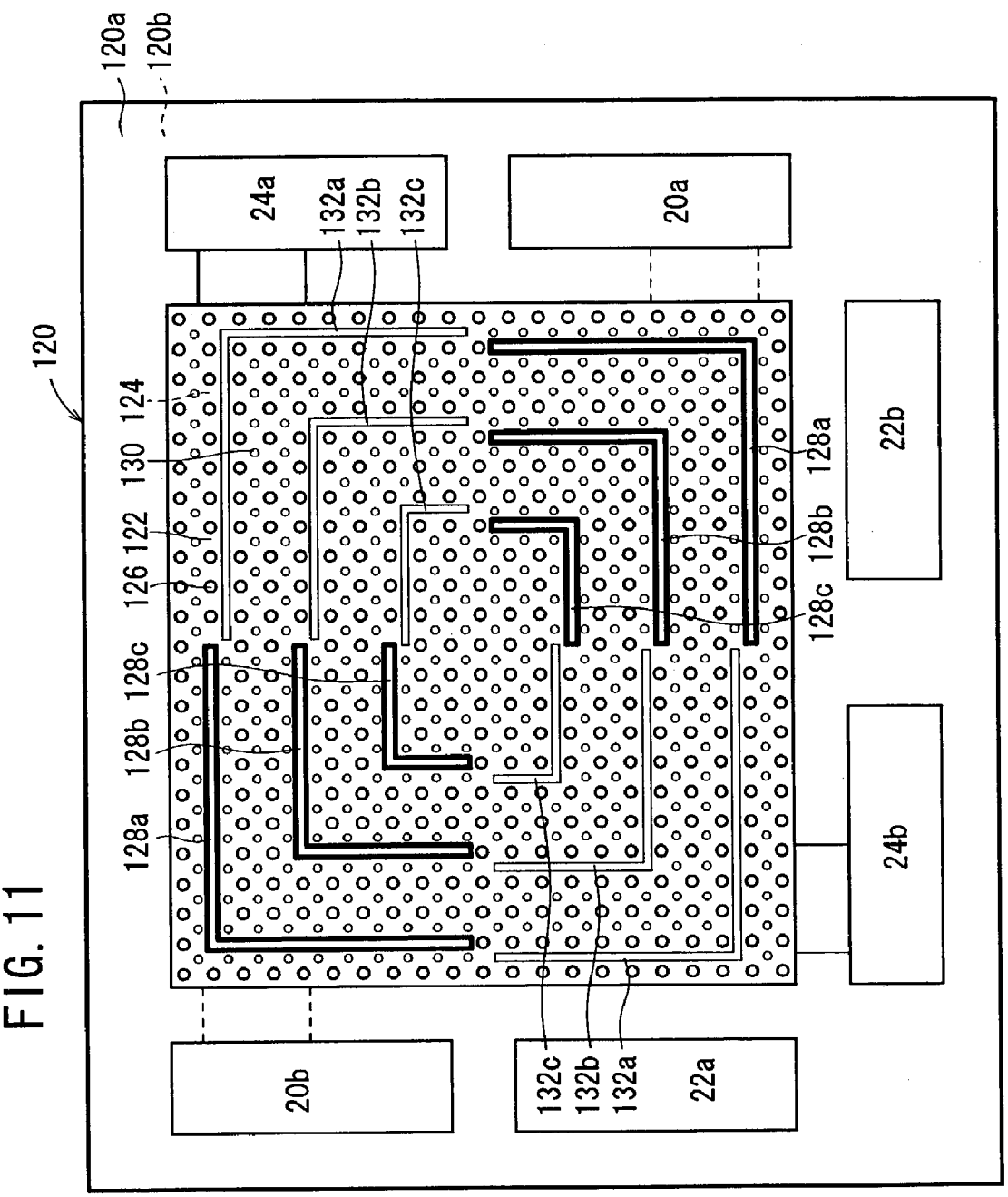
FIG. 11 is a front elevational view of a separator of a fuel cell according to a fifth embodiment of the present invention.

FIG. 11 shows in front elevation a separator 120 of a fuel cell according to a fifth embodiment of the present invention.

In FIG. 11, the separator 120 has a fuel gas passage 122 defined on a surface 120a thereof and a coolant passage 124 defined on an opposite surface 120b thereof. The fuel gas passage 122 has a plurality of embossed bodies 126 projecting from the surface 120a and pairs of guide ribs 128a, 128b, 128c which are provided by joining two or more embossed bodies 126. The guide ribs 128a through 128c substantially L-shaped.

The coolant passage 124 has a plurality of embossed bodies 130 projecting from the surface 120b and pairs of guide ribs 132a, 132b, 132c which are provided by joining two or more embossed bodies 130. The guide ribs 132a through 132c are substantially L-shaped. The guide ribs 128a through 128c and the guide ribs 132a through 132c are located in symmetrical positions on the separator 120.

Figure 12:
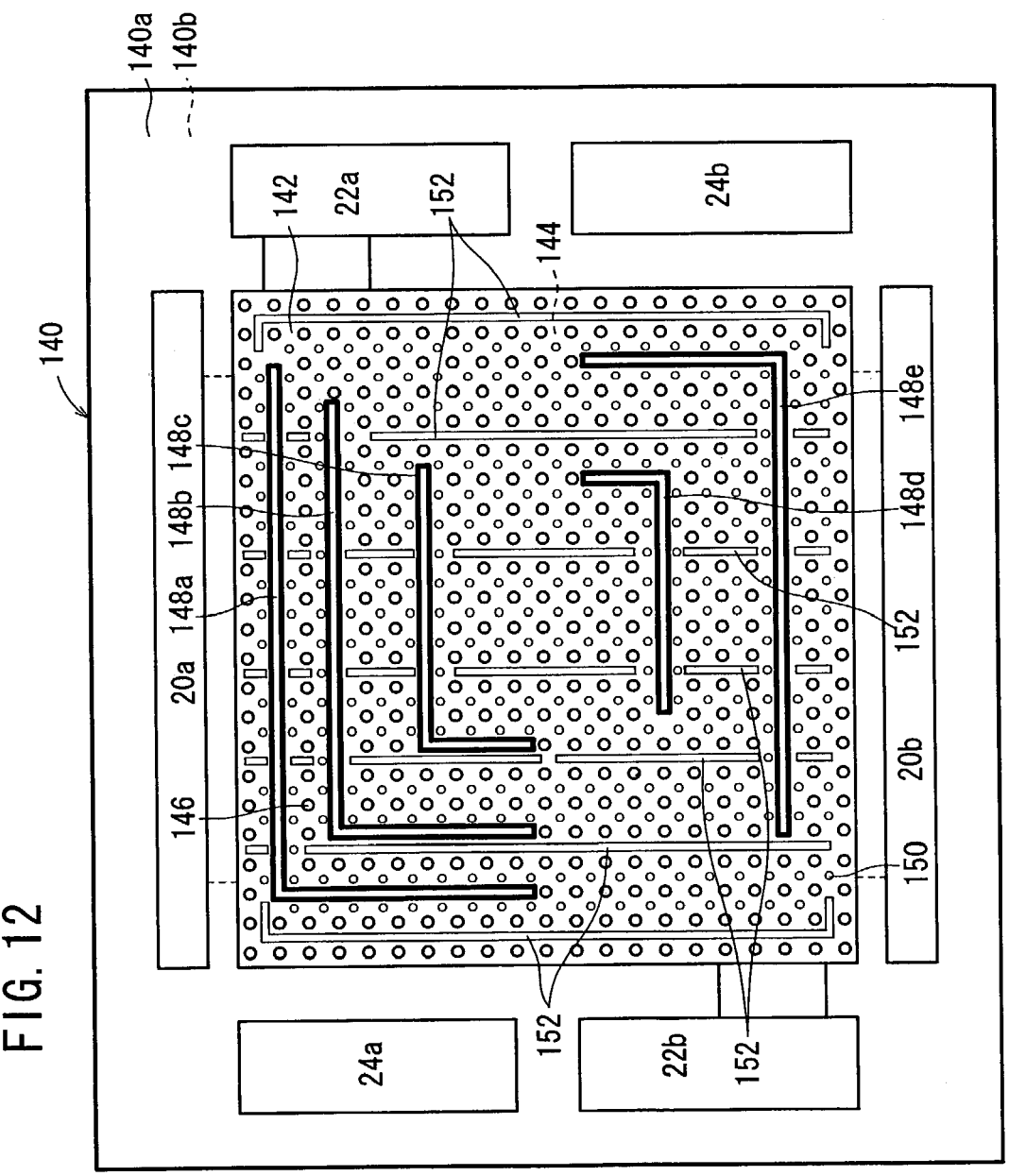
FIG. 12 is a front elevational view of a separator of a fuel cell according to a sixth embodiment of the present invention.

FIG. 12 shows in front elevation a separator 140 of a fuel cell according to a sixth embodiment of the present invention.

In FIG. 12, the separator 140 has an oxygen-containing gas passage 142 defined on a surface 140a thereof and a coolant passage 144 defined on an opposite surface 140b thereof. The oxygen-containing gas passage 142 has a plurality of embossed bodies 146 projecting from the surface 140a and guide ribs 148a, 148b, 148c, 148d, 148e which are provided by joining two or more embossed bodies 146. The guide ribs 148a through 148e substantially L-shaped.

The coolant passage 144 has a plurality of embossed bodies 150 projecting from the surface 140b and a plurality of, e.g., seven, vertical guide ribs 152 which are provided by joining two or more embossed bodies 150. The guide ribs 152 have portions overlapping the guide ribs 148a through 148e.

Figure 13:
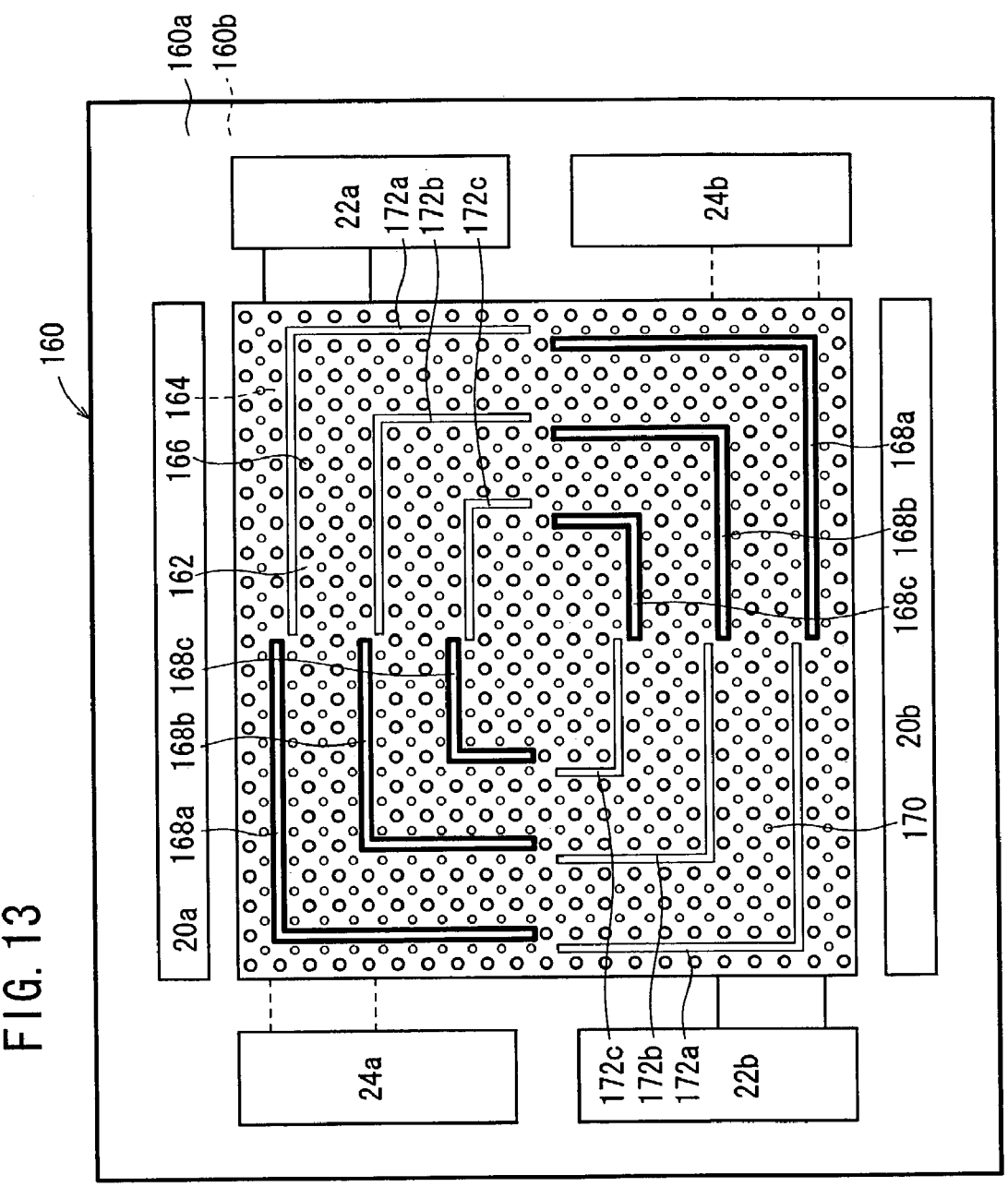
FIG. 13 is a front elevational view of a separator of a fuel cell according to a seventh embodiment of the present invention.

FIG. 13 shows in front elevation a separator 160 of a fuel cell according to a seventh embodiment of the present invention.

In FIG. 13, the separator 160 has an oxygen-containing gas passage 162 defined on a surface 160a thereof and a fuel gas passage 164 defined on an opposite surface 160b thereof. The oxygen-containing gas passage 162 has a plurality of embossed bodies 166 projecting from the surface 160a and pairs of guide ribs 168a, 168b, 168c which are provided by joining two or more embossed bodies 166.

The fuel gas passage 164 has a plurality of embossed bodies 170 projecting from the surface 160b and pairs of guide ribs 172a, 172b, 172c which are provided by joining two or more embossed bodies 170. The guide ribs 168a, 168b, 168c and the guide ribs 172a, 172b, 172c are substantially L-shaped, and located in diagonally opposite positions on the separator 160.

Figure 14:
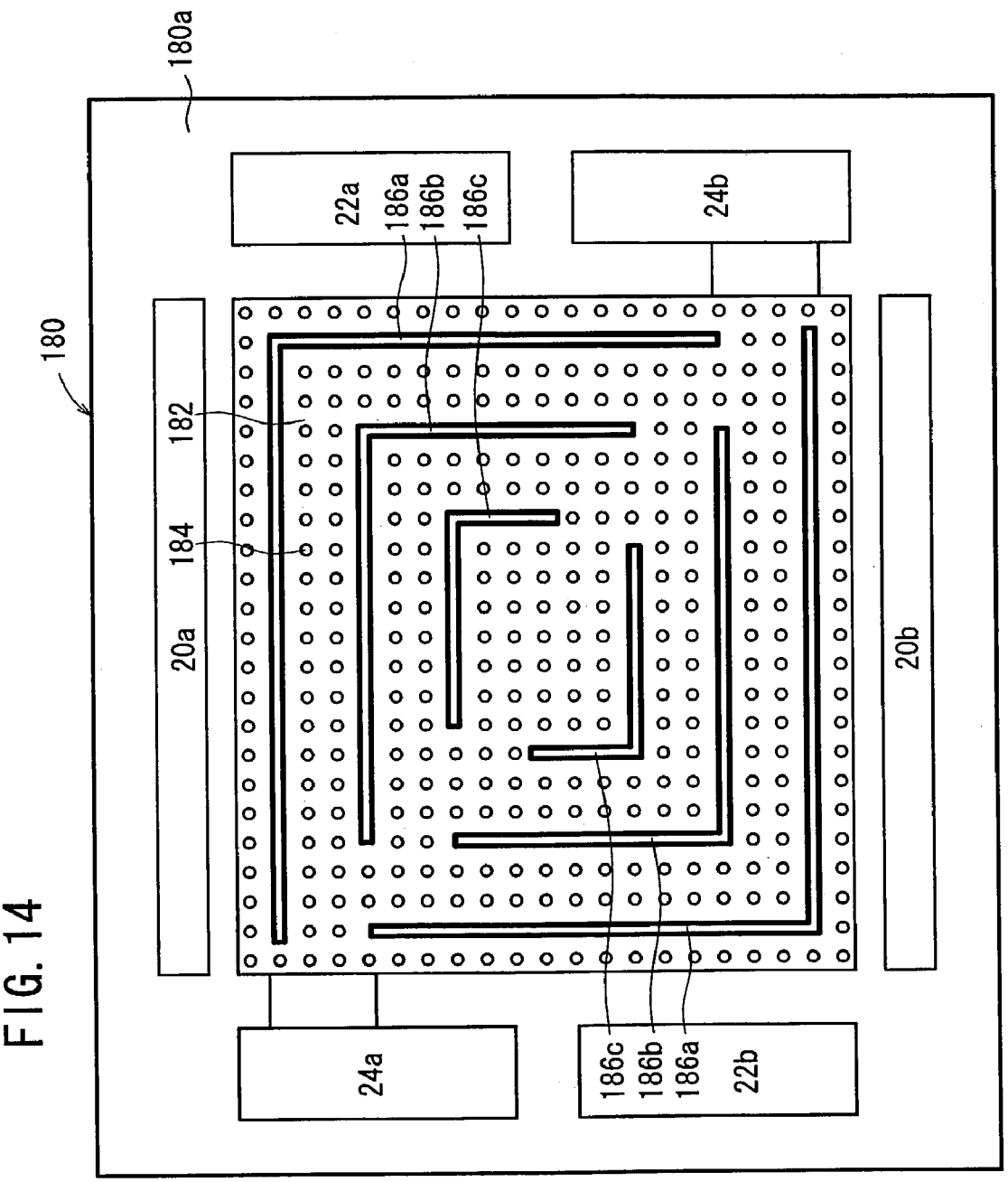
FIG. 14 is a front elevational view of a separator of a fuel cell according to an eighth embodiment of the present invention.

FIG. 14 shows in front elevation a separator 180 of a fuel cell according to an eighth embodiment of the present invention.

In FIG. 14, the separator 180 has a fuel gas passage 182 defined on a surface 180a thereof. The fuel gas passage 182 has a plurality of embossed bodies 184 projecting from the surface 180a and pairs of guide ribs 186a, 186b, 186c which are provided by joining two or more embossed bodies 184. The guide ribs 186a through 186c are substantially L-shaped.

Figure 15:
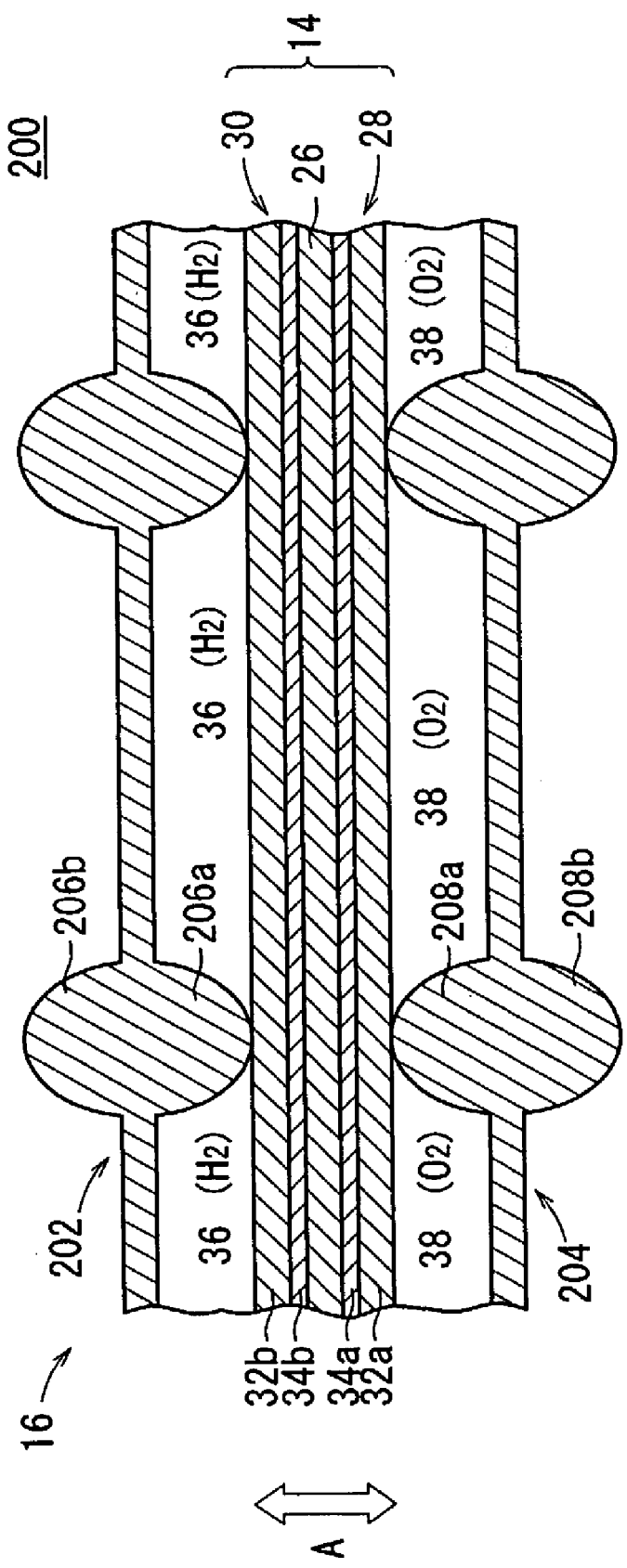
FIG. 15 is a fragmentary cross-sectional view of a fuel cell according to a ninth embodiment of the present invention.
Figure 16:
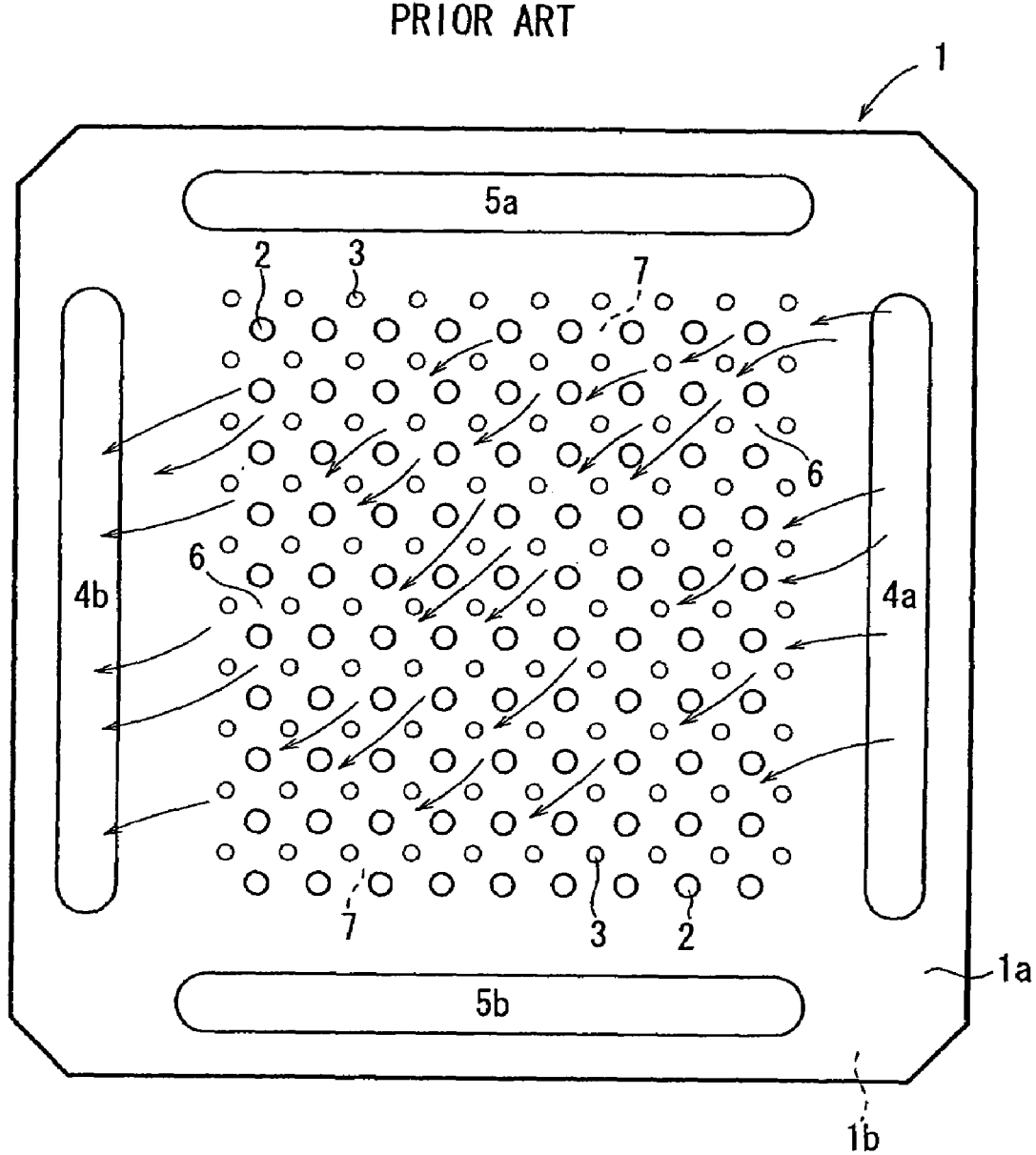
FIG. 16 is a front elevational view of a conventional separator.

FIG. 15 shows in fragmentary cross section a fuel cell 200 according to a ninth embodiment of the present invention. In FIG. 15, the fuel cell 200 has first and second separators 202, 204. The first separator 202 has a plurality of protrusions 206a, 206b on its opposite surfaces, and the second separator 204 has a plurality of protrusions 208a, 209b on its opposite surfaces. The first separator 202 has a fuel gas passage 36 defined on the surface on which the protrusions 206a project, and the second separator 204 has an oxygen-containing gas passage 38 defined on the surface on which the protrusions 208a project.

With the fuel cell 200, the thickness of the first and second separators 202, 204 may be reduced to allow the fuel gas passage 36 and the oxygen-containing gas passage 38 to have an increased cross-sectional passage area.

The fuel cell according to the present invention has a pair of metal sheet separators, at least one of the separators having a reactant gas passage having a plurality of protrusions and guide ribs provided by joining two or more protrusions. The reactant gas passage thus constructed is effective to prevent the reactant gas from failing to flow therethrough, and guide the reactant gas uniformly to the electrode surface. Thus, the reactant gas can sufficiently be supplied to the electrode surface, and the ability of the fuel cell to discharge generated water is prevented from being lowered by a flow failure of the fuel gas which would otherwise be caused. Therefore, the fuel cell has a highly efficient function to generate electric energy.

Although certain preferred embodiments of the present invention have been shown and described in detail, it should be understood that various changes and modifications may be made therein without departing from the scope of the appended claims.

What is claimed is:

1. A fuel cell comprising:

an electrolyte electrode assembly comprising an electrolyte and electrodes disposed one on each side of the electrolyte; and a pair of metal sheet separators sandwiching said electrolyte electrode assembly therebetween;

said metal sheet separators having reactant gas passages for supplying a reactant gas which comprises at least a fuel gas or an oxygen-containing gas to an electrode surface of one of said electrodes of said electrolyte electrode assembly;

said reactant gas passage being defined on at least one of said separators and having a plurality of protrusions projecting from a surface of the separator which faces one of said electrodes, and a guide rib provided by joining at least two of said protrusions, for uniformly guiding said reactant gas to said electrode surfacer, wherein at least said one of the metal sheet separators has:

a coolant passage for supplying a coolant to cool said electrolyte electrode assembly;

said coolant passage having a plurality of protrusions projecting from a surface of the separator which faces away from said reactant gas passage, and a guide rib provided by joining at least two of said protrusions, for uniformly guiding said coolant along the electrode surface, wherein said guide ribs projecting from both surfaces of said one of the separators include a guide rib which is continuous in an area where guide ribs overlap each other, and a guide rib which is not continuous in said area.

2. A fuel cell according to claim 1, wherein said guide rib includes a straight portion extending straight on at least a surface of said one of the metal sheet separators.

3. A fuel cell according to claim 1, wherein said guide rib is substantially L-shaped and extends on at least a surface of said one of the metal sheet separators.

4. A fuel cell according to claim 1, wherein said guide rib is substantially L-shaped and extends interruptedly on at least a surface of said one of the metal sheet separators.

* * * * *